US012162043B2

(12) United States Patent
Ehrhardt

(10) Patent No.: US 12,162,043 B2
(45) Date of Patent: Dec. 10, 2024

(54) EXTRACTION SYSTEM FOR POLLUTED AIR

(71) Applicant: Daniel Ehrhardt, Neu-Ulm (DE)

(72) Inventor: Daniel Ehrhardt, Neu-Ulm (DE)

(*) Notice: Subject to any disclaimer, the term of this patent is extended or adjusted under 35 U.S.C. 154(b) by 220 days.

(21) Appl. No.: 17/774,307

(22) PCT Filed: Nov. 4, 2020

(86) PCT No.: PCT/EP2020/080868
§ 371 (c)(1),
(2) Date: May 4, 2022

(87) PCT Pub. No.: WO2021/089577
PCT Pub. Date: May 14, 2021

(65) Prior Publication Data

US 2022/0388046 A1 Dec. 8, 2022

(30) Foreign Application Priority Data

Nov. 4, 2019 (DE) ..................... 10 2019 129 608.0
Nov. 4, 2019 (DE) ..................... 20 2019 106 106.5

(51) Int. Cl.
*B08B 15/02* (2006.01)
*E04H 1/12* (2006.01)

(52) U.S. Cl.
CPC ............... *B08B 15/02* (2013.01); *E04H 1/12* (2013.01)

(58) Field of Classification Search
None
See application file for complete search history.

(56) References Cited

U.S. PATENT DOCUMENTS 3,766,844 A * 10/1973 Donnelly ................ F24F 3/167 454/238
4,267,769 A * 5/1981 Davis ........................ A61L 9/16 D25/1
4,667,579 A * 5/1987 Daw ......................... B01L 1/04 52/509
5,558,112 A * 9/1996 Strieter ................. B09B 3/0066 135/900
10,343,293 B1 * 7/2019 Taylor ................... B08B 15/026
(Continued)

FOREIGN PATENT DOCUMENTS

CN 106140770 A 11/2016
DE 30 41 991 A1 5/1982
(Continued)

OTHER PUBLICATIONS

PCT Written Opinion for PCT Application No. PCT/EP2020/080868 dated Mar. 4, 2021—English translation.
German Search Report for German Application No. 10 2019 129 608.0 dated Sep. 30, 2020 with English translation.

*Primary Examiner* — Joseph A Dillon, Jr.
(74) *Attorney, Agent, or Firm* — Muncy, Geissler, Olds & Lowe, P.C.

(57) ABSTRACT

An extraction system for polluted air includes a circumferential side wall, the side wall having at least four detachable side wall elements. At least one of the wall elements is trough shaped. The at least one wall element has a base surface with an upper edge, a lower edged and two side edges, and folds on the upper edge and on the two side edges are U-shaped with the base surface, and a fold on the lower edge is S-shaped with the base surface.

16 Claims, 8 Drawing Sheets

(56) References Cited

U.S. PATENT DOCUMENTS

| | | | | |
|---|---|---|---|---|
| 10,518,301 | B1 * | 12/2019 | Diebold | B08B 15/02 |
| 2007/0089383 | A1 * | 4/2007 | Spengler | F24F 11/0001 55/385.2 |
| 2008/0282652 | A1 * | 11/2008 | Wardlaw | F16P 1/06 55/385.2 |
| 2009/0085447 | A1 * | 4/2009 | McLuckie | B01L 1/50 312/234.1 |
| 2009/0111369 | A1 * | 4/2009 | Carrig | B08B 15/00 55/356 |
| 2011/0065370 | A1 * | 3/2011 | Reid | B08B 15/02 29/428 |
| 2013/0303066 | A1 * | 11/2013 | Waulters | E04H 1/1277 454/65 |
| 2018/0015513 | A1 * | 1/2018 | Gwilliam | A01K 29/00 |
| 2018/0133764 | A1 * | 5/2018 | Reid | B08B 15/02 |
| 2023/0031985 | A1 * | 2/2023 | Basti | A47L 7/0019 |
| 2023/0076994 | A1 * | 3/2023 | Hochberg | B65D 11/02 |
| 2023/0134410 | A1 * | 5/2023 | Mellor | B01L 1/04 454/187 |
| 2023/0218463 | A1 * | 7/2023 | Kapila | F24F 8/108 600/21 |

FOREIGN PATENT DOCUMENTS

| | | | | | |
|---|---|---|---|---|---|
| DE | 102005016428 | A1 | * | 10/2006 | B05B 15/1214 |
| DE | 10 2014 202 271 | B3 | | 3/2015 | |
| DE | 10 2018 125 681 | A1 | | 4/2020 | |
| EP | 3103552 | A1 | * | 12/2016 | |
| FR | 2593727 | A1 | * | 1/1986 | |
| KR | 20090020962 | A | * | 8/2007 | |
| KR | 20180086874 | A | * | 1/2017 | |

* cited by examiner

EXTRACTION SYSTEM FOR POLLUTED AIR

This nonprovisional application is a National Stage of International Application No. PCT/EP2020/080868, which was filed on Nov. 4, 2020, and which claims priority to German Patent Application No. 10 2019 129 608.0, which was filed in Germany on Nov. 4, 2019 and German Patent Application No. 10 2019 106 106.5, which was filed in Germany on Nov. 4, 2019, and which are all herein incorporated by reference.

BACKGROUND OF THE INVENTION

Field of the Invention

The present invention relates to an extraction system for polluted air, in particular for air polluted with grinding dust or welding smoke.

Description of the Background Art

During material processing, in particular by grinding, welding, soldering, cutting and engraving, dust or smoke is released and is inhaled by the respective operator or by other persons in the vicinity. The polluted air often consists of a mixture of gas and fine dust as well as smoke and particles. Such constituents, which are harmful to health, are filtered out of the ambient air by means of an extraction system. The extraction systems used according to the prior art are typically of largely monolithic construction and therefore take up quite a large amount of space, which makes their transport to the place of use comparatively expensive. In addition, conventional extraction systems have only limited scalability and expandability.

SUMMARY OF THE INVENTION

The object of the invention is therefore to specify an extraction system which is readily transportable and easily scalable or expandable.

This object is achieved with the extraction system having the features of the present invention.

The extraction system according to the invention for polluted air has a circumferential side wall, the side wall having at least four detachable side wall elements. As a result, the extraction system according to the invention can be packed compactly for transport, and a small transport size can thereby be obtained.

A further advantage of the extraction system is that the extraction system can be set up in a modular fashion. This means that, by virtue of the detachable side wall elements of the circumferential side wall, the extraction system can be expanded as required and adapted to the respective location of use. In particular, it is possible here for the extraction system to be expanded as required in terms of structural height and structural area in a modular fashion.

The extraction system can comprise an electrically operated fan for sucking in ambient air, a filter for cleaning and filtering the ambient air sucked in, and a discharge device. The discharge device serves to separate particles or to remove the particles, filtered out of the ambient air, from the system. The side wall elements at least partially enclose these components and support a guided flow of the sucked-in air through the extraction system.

In the extraction system according to the invention, depending on the application, electrically operated fans with corresponding power ratings can be used. This makes it possible to suck different amounts of air into the extraction system depending on the application and on the location of use. It is expediently possible to design the electrically operated fans in such a way that they can be used over an adjustable power range. It is thus possible, where necessary, to reduce or increase the amount of air that is sucked in.

Various filtration methods can be used to filter and purify the air that is sucked in. It is thus possible to operate the extraction system according to the invention with regenerative filter elements. However, exchangeable filter elements can also be used. Another possibility is to use wet separators. Which filtration method is used usually depends on the type of particles that are intended to be removed from the air that is sucked in. The extraction system according to the invention is designed in such a way that the filter methods can be used interchangeably. In other words, depending on the application, a filter for one of the stated filter methods can be built into the extraction system according to the invention.

In one variant, the extraction system is designed in such a way that at least one side wall element has one or more access openings, which can be closed by means of a door element, e.g. a cover. This permits simple maintenance of the components arranged within the extraction system. Furthermore, through such accesses to the interior of the extraction system, which are also referred to as service openings, it is possible to repair or replace components within the extraction system.

In a further embodiment of the invention, a side wall element of the extraction system is designed with a trough shape. The side wall element has an edge-shaped, outwardly directed fold. A side wall element can be produced from a substantially rectangular surface element with two long sides and two broad sides. Edge regions of the two long sides and edge regions of the two broad sides of the surface element are here bent or folded with respect to a base surface of the side wall element. The fold also serves for connection of the individual side wall elements, which can be a screw connection or plug connection. For this purpose, the folds have corresponding recesses or projections.

However, it is also possible for the side wall element to have an edge-shaped profile which has circumferential elevations to the outside. In the case of an edge-shaped, outwardly directed fold, the side wall element can be formed in one piece. In the case of an edge-shaped profile, the side wall element can also be designed in several pieces.

One advantage here is that, in the interior of the extraction system, the side wall elements form a flat surface without projections or steps, as a result of which turbulence in the air flowing through the extraction system is avoided. In other words, because the fold of the side wall element points outward, mutually adjoining side wall elements can be connected to one another in such a way that a homogeneous transition is created between the respective side wall elements. In particular, this makes it easier to clean the interior of the system.

In a variant of the extraction system according to the invention, the side wall element has a base surface with an upper edge, a lower edge, and two side edges. The folds on the upper edge and also on the two side edges are here formed in a U shape with the base surface, and the fold on the lower edge is formed in an S shape with the base surface. The edge-shaped fold consists of a first portion and a second portion. In the case of a U-shaped fold, the first portion is folded by +90° with respect to the base surface. The second portion is folded by +90° in the same direction with respect to the first portion. The second portion thus lies opposite the base surface, as a result of which a U-shape is formed together with the first portion and the base surface.

In the case of an S-shaped fold, the first portion is folded by +90° with respect to the base surface, corresponding to the U-shaped fold. The second portion is folded by −90° in the opposite direction with respect to the first portion. The second portion is thus parallel to the base surface, but does not lie opposite the base surface. The base surface, the first portion and the second portion thus form an S-shape.

In a variant of the invention, two side wall elements are arranged one above the other, i.e. two side wall elements are arranged along the longitudinal axis of the extraction system. This makes it possible to obtain an extraction system with a greater height. Here, the S-shaped fold on the lower edge of the upper side wall element is designed in such a way that it at least partially engages around the U-shaped fold on the upper edge of the lower side wall element. In the interior of the extraction system, the transition from an upper side wall element to a lower side wall element arranged below is thus stepless. The air flowing in the interior of the extraction system can thus flow along the inner wall of the extraction system without turbulence.

In a further embodiment of the invention, a connection element is present for connecting at least two side wall elements. The connection element has a receiving region for receiving a portion of the fold of both side wall elements. When connecting two side wall elements which are arranged side by side and in which the folds lie parallel to one another, the connection element can have a groove as the receiving region. The two folds engage in this groove. The groove is designed in such a way that a clamping force acts on the two folds, as a result of which they are pressed against each other.

When connecting two side wall elements arranged perpendicular to each other, the receiving region of the connection element is designed in such a way as to receive the folds of the side wall elements arranged perpendicular to each other. The side wall elements are optimally fixed in this way. The receiving region can have a first groove for receiving the fold of one side wall element, and a second groove for receiving the fold of the other side wall element. A plug connection between side wall elements can thus be obtained. This ensures that the module can be assembled and disassembled quickly and easily. Furthermore, the parts that are needed to set up the extraction system are reduced, and therefore the assembly of the system is greatly simplified and more efficient.

The use of the described connection elements also affords further possibilities for realizing technical advantages. For example, the connection elements can be designed in such a way that the sharp outer edges resulting from the folds are concealed or covered, in particular having a rounded or polygonal cross section in the regions facing away from the system. This considerably reduces the risk of injury and also enhances the visual appearance of the system. Such connection elements, for example as rod material that can be cut to size, can be easily produced by plastic extrusion, for example.

In another embodiment, a corner angle element is present for screwing a first side wall element to a second side wall element, which is arranged perpendicular thereto.

In a further variant, the number of side wall elements along one long side of the extraction system is different from the number of side wall elements of the other long side, and/or the number of side wall elements along one broad side of the extraction system is different from the number of side wall elements of the other broad side. It is thereby possible that side wall elements on a long side or on a broad side can have different dimensions compared to the side wall elements on the respective other long side or broad side. One advantage here is that the extraction system can thus be better constructed in a modular fashion and can thus be specifically adapted to the particular location of use. Furthermore, the individual parts of the extraction system can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
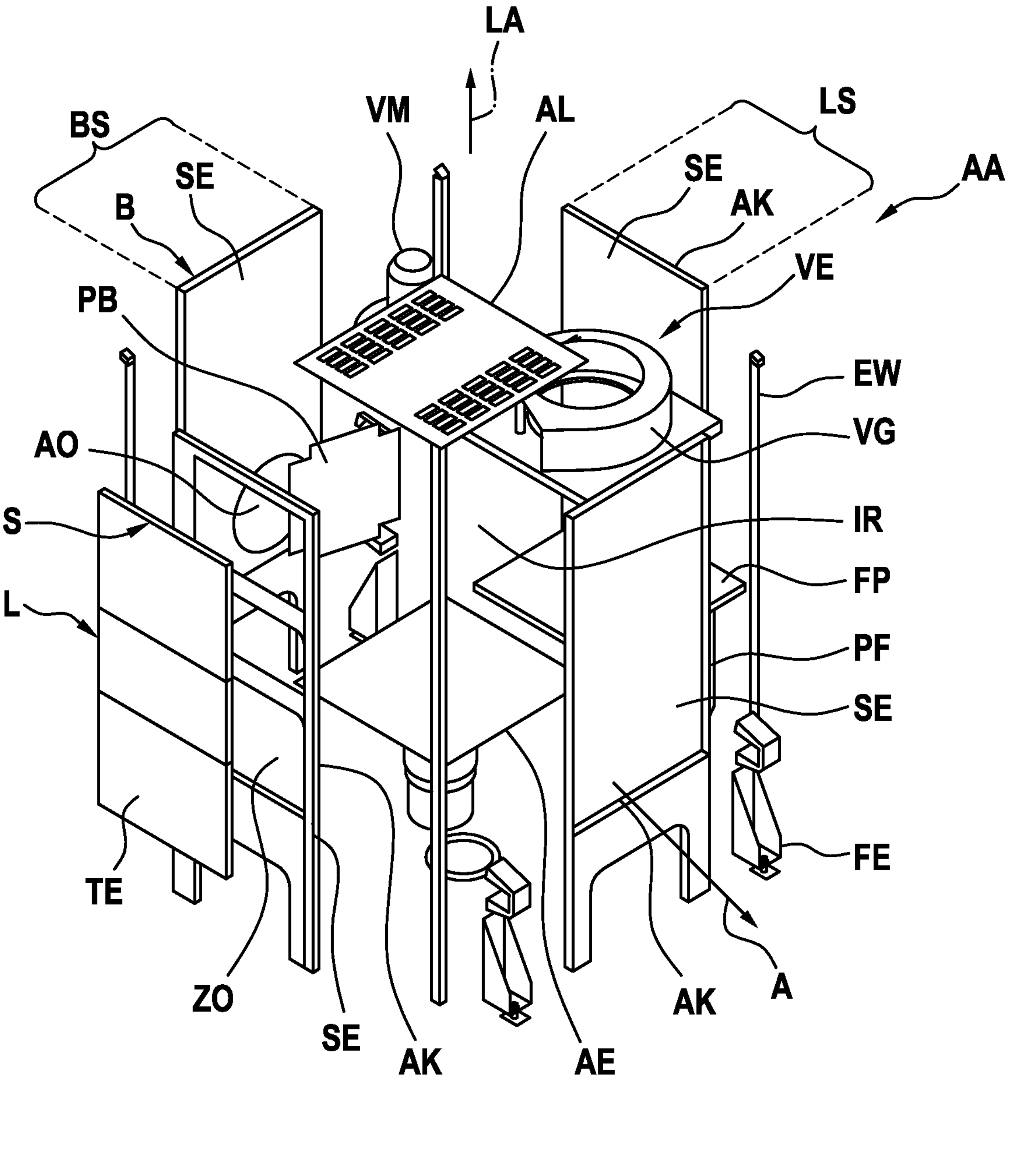
FIG. 1*a* shows an exploded view of an extraction system according to the invention.

FIG. 1*a* shows an exploded view of an extraction system AA according to the invention. The extraction system AA is constructed in modular fashion from four rectangular side wall elements SE with a length L and a width B, which form the circumferential side wall S of the extraction system AA. The modular structure of the extraction system AA is further characterized in that an interior IR of the extraction system AA, formed by the circumferential side wall S, is closed at one end (top) by an exhaust cover AL and at an opposite end (underside) by a device AE for discharging filtered out and/or separated particles.

In the interior IR of the extraction system AA in the example shown, a compressor unit VE with compressor housing VG and compressor motor VM and a filter plate FP with filter cartridges PF (only partially visible) are arranged from top to bottom along the longitudinal axis LA. During operation, the compressor unit VE generates a negative pressure in the region above the filter plate FP, such that polluted outside air is conveyed through a suction opening AO formed in a side wall element SE, through the separator PA and through the filter cartridges FP and, in a cleaned state, after passing the compressor unit VE, leaves the extraction system AA through the exhaust cover AL. The baffle plate PB, arranged behind the suction opening AO in the direction of flow, prevents a situation where more solid particles in the air flow damage the cartridge filter PF, and it also ensures a certain turbulence of the polluted air entering the interior IR and thus, as a result, more uniform loading of the filter cartridges FP with particles.

The side wall element SE designed with the suction opening AO is designed, for example, in such a way that detection elements (not shown) for ambient air can be attached. In particular, it is possible that the opening of a hose or of a pipe (not shown) can be attached via the suction opening AO. This makes it possible to transport ambient air to be cleaned over a greater distance. This is necessary, for example, in cases in which the extraction system cannot be brought directly to the location where the polluted air arises.

The compressor unit VE, the filter plate FP and the discharge unit AE are connected to the side wall elements SE, which as a secondary effect also increases the stability of the extraction system AA. The connection can take place in particular by means of a screw connection or by means of a plug connection.

The four side wall elements SE form the long side LS and the broad side BS the extraction system AA. By way of example, the four side wall elements SE each have the same widths B. Of course, it is also possible that the side wall elements SE have different widths B, only a rectangular cross section of the extraction system AA having to be guaranteed.

A side wall element SE has a plurality of access openings ZO. Through these access openings ZO, the devices VE, FP and AE arranged in the interior IR of the extraction system AA can be serviced, or cartridge filters PF that have been used up can be replaced. The access openings ZO are closable by means of door elements TE.

Figure 1B:
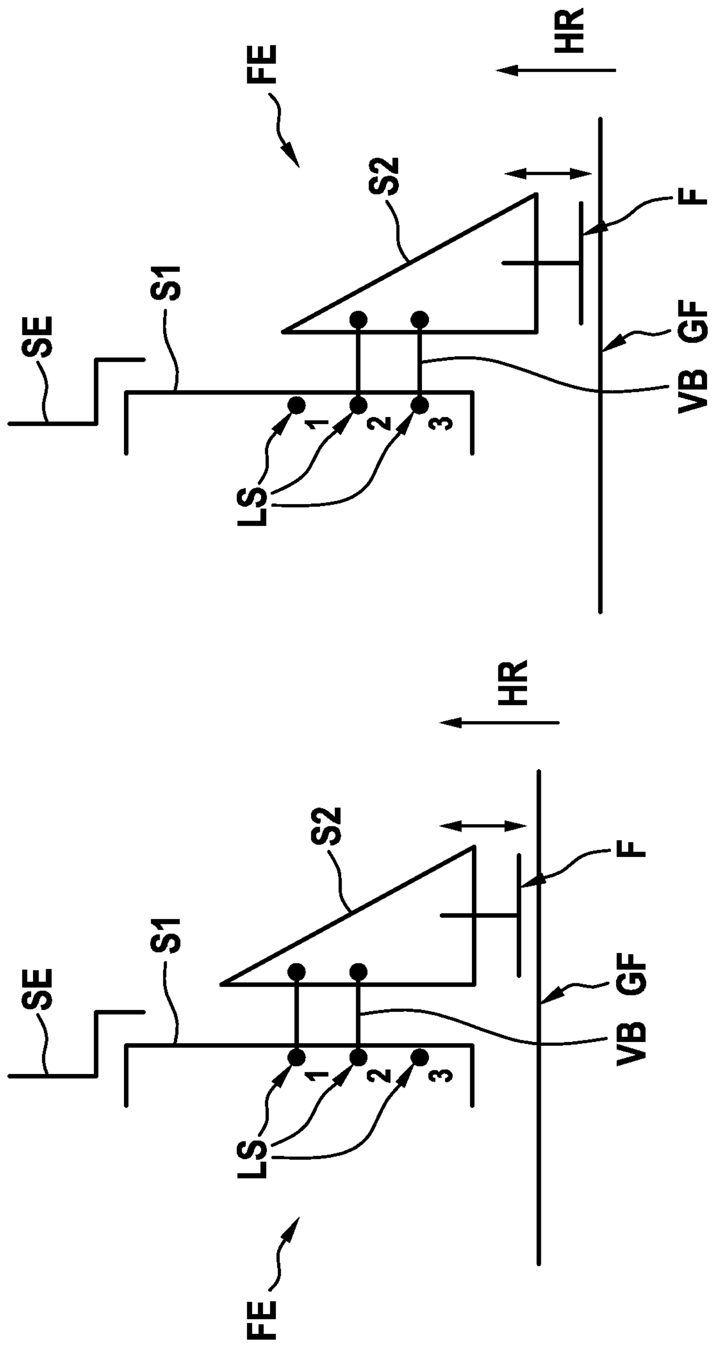
FIG. 1*b* shows a schematic view of a foot element of an extraction system according to the invention.

The extraction system AA also has foot elements FE, which rest on a ground surface GF. This makes it possible for the extraction system AA to be optimally positioned according to its location of use. FIG. 1*b* shows a schematic detail of a foot element FE of an extraction system according to the invention, which foot element FE is designed in such a way that a coarse height adjustment and a fine height adjustment are possible. The foot element FE comprises a first support element S1 and a second support element S2. The first support element S1 is here fixedly connected to a side wall element SE of the extraction system. The second support element S2 has, for example, two connection elements VB, e.g. screws or pins, by means of which a connection of the second support element S2 to the first support element S1 is possible. For this purpose, a plurality of recesses LS that are spaced apart from one another are present in the first support element S1, in which recesses LS the connection elements VB can engage. In the illustration on the left in FIG. 1*b*, the two connection elements VB of the second support element S2 are introduced into the recesses 1 and 2 of the first support element 1. In the illustration on the right in FIG. 1*b*, the connection elements VB of the second support element S2 are introduced into the recesses 2 and 3 of the second support element S2. This makes it possible to move the extraction system in the height direction HR perpendicular to the ground surface GF according to the pattern of the recesses LS in the first support element S1. A fine adjustment of the height setting is possible by means of a rotatable foot F on the second support element S2. This foot F expediently has a thread and can thus be moved relative to the second support element S2.

It is of course possible that the foot element FE alternatively or additionally has rollers or wheels. This makes it possible to position the extraction system optimally and precisely and to move it quickly to a desired location of use.

Figure 1C:
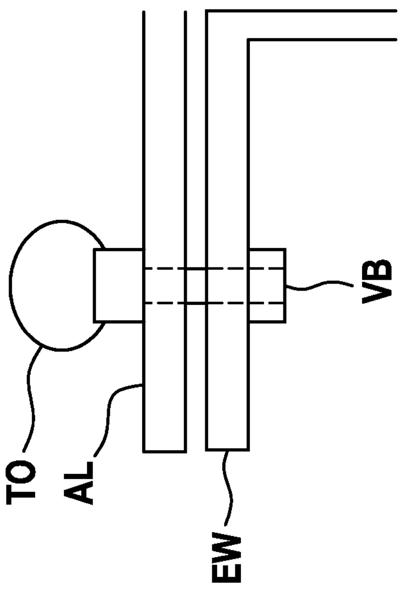
FIG. 1*c* shows a schematic view of an arrangement for lifting the extraction system according to the invention.

FIG. 1*c* shows a schematic view of a device for lifting the extraction system according to the invention. A corner angle element EW according to FIG. 1*a* is shown. This corner angle element EW is connected, e.g. screwed, to a cover, e.g. the exhaust cover AL, by means of a connection element VB. The connection element VB here has a transport device VO, e.g. an eyelet for connection to a lifting device (not shown), for example a crane. Such a transport device is expediently provided at each corner angle element EW. This makes it possible to bring the extraction system according to the invention quickly and easily to a desired location of use.

Figure 2A:
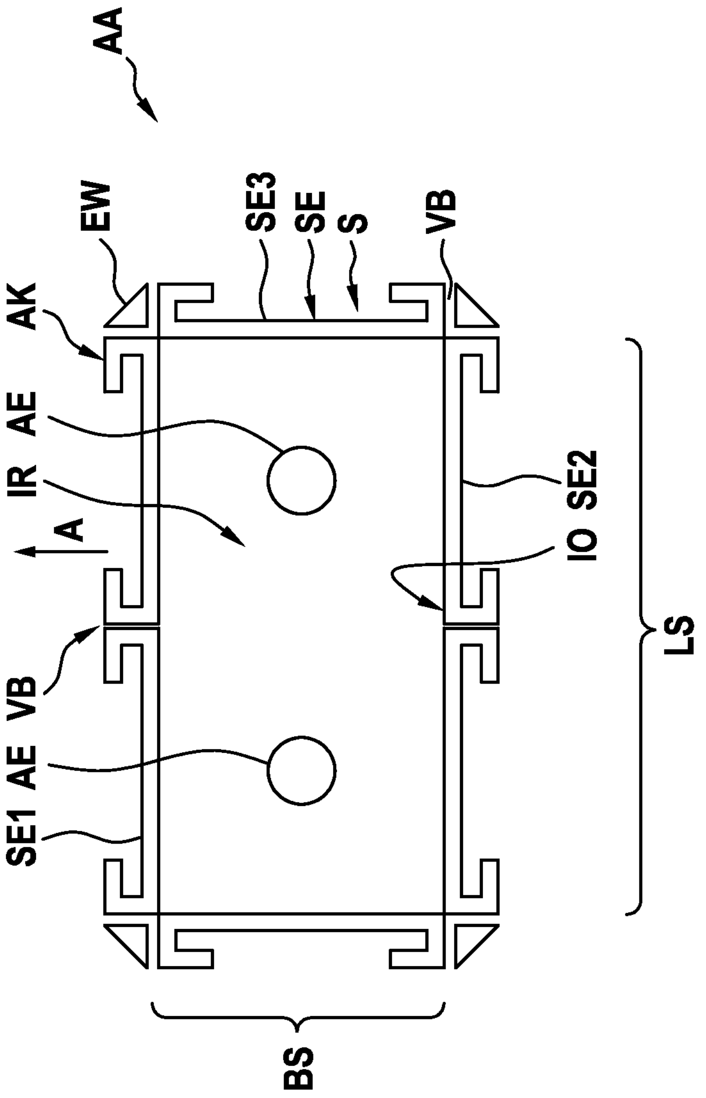
FIG. 2*a* shows, in a plan view, a first exemplary representation of a modular expansion of the extraction system according to FIG. 1.

FIG. 2*a* shows, in a plan view, a first exemplary schematic representation of a modular expansion of the extraction system AA in FIG. 1*a*. The illustration is a sectional illustration perpendicular to the longitudinal axis LA. The cross section of the extraction system AA is here rectangular with a long side LS and a broad side BS. The side walls S of the extraction system AA form, on the long sides LS, two respective side wall elements SE1, SE2, and, on the broad sides BS, a respective side wall element SE3.

The interior IR is closed off, on the underside of the extraction system AA, by two discharge units AE. However, it is also possible to arrange, on the underside of the extraction system AA, a single discharge unit AE which has a suitable size for closing off the interior IR at the bottom. For reasons of clarity, the further components of the extraction system AA that have been described with reference to FIG. 1*a* are not shown here.

Figure 2B:
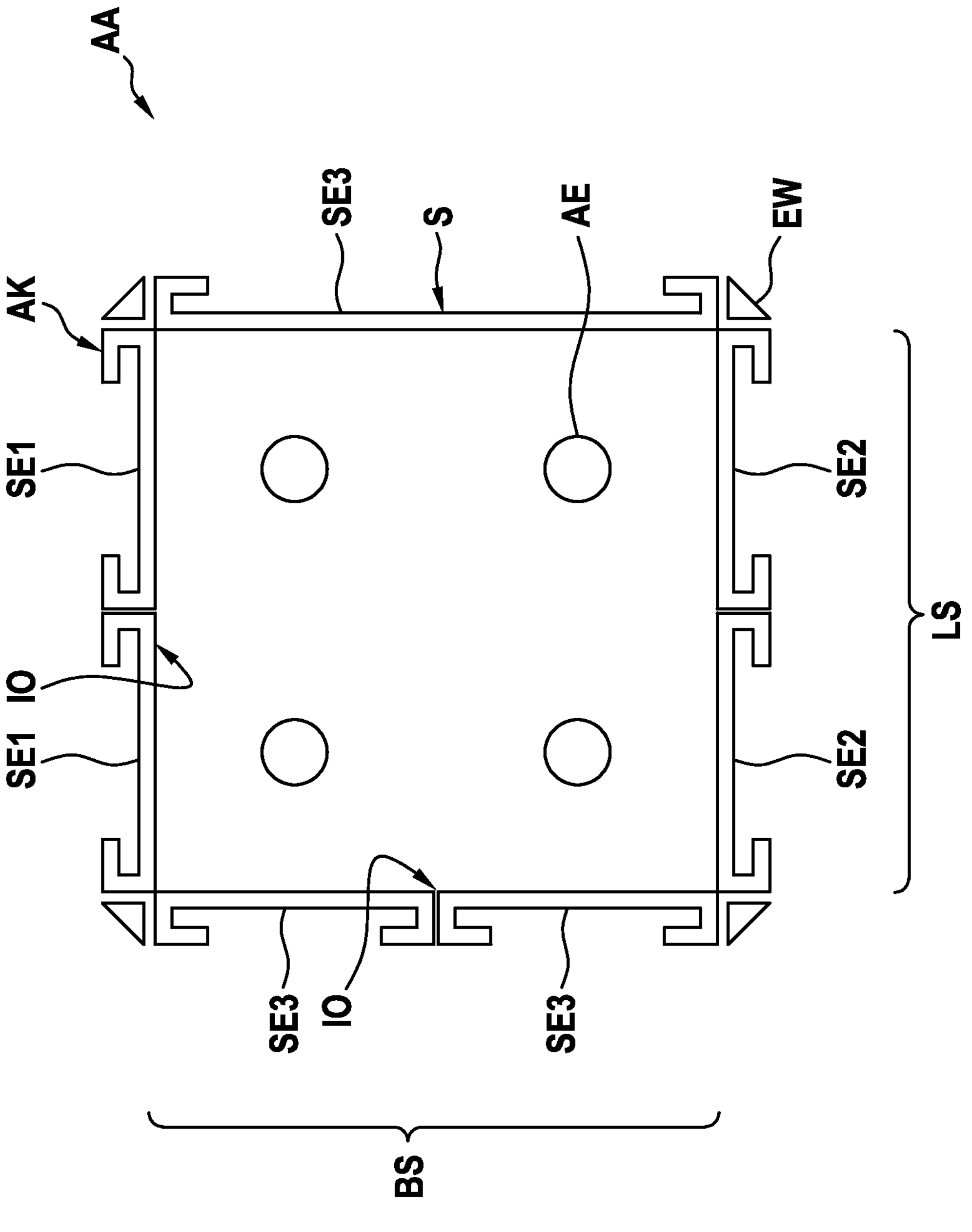
FIG. 2*b* shows, in a plan view, a second exemplary representation of a modular expansion of the extraction system according to FIG. 1.
Figure 2C:
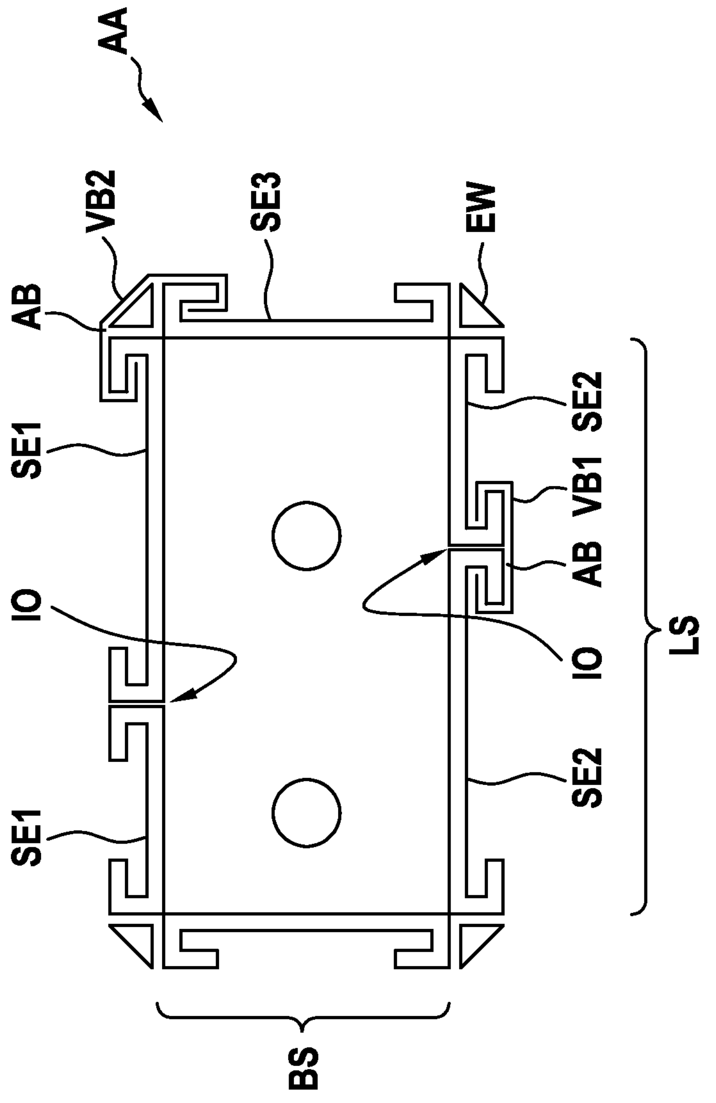
FIG. 2*c* shows, in a plan view, a third exemplary representation of a modular expansion of the extraction system according to FIG. 1.

By the addition of side wall elements SE on the long sides LS and/or the broad sides BS of the extraction system AA, as shown in FIGS. 2*b* and 2*c*, the side wall S and therefore the size of the extraction system AA can be individually adapted to the respective location of use. The further components as described above in the interior IR of the extraction system AA can be arranged and adapted accordingly. This ensures a modular construction of the extraction system AA.

FIG. 2*b* shows an example of a modular expansion of the extraction system AA in which both long sides LS are formed in each case by two side wall elements SE1, SE2. One broad side BS is formed by two side wall elements SE3, and the other broad side BS is formed by one side wall element SE3, which is twice the width of the side wall elements SE3 of the opposite broad side BS. It is thus possible to construct an extraction system with side wall elements SE3 of different widths.

A further example of a modular expansion of the extraction system AA is shown in FIG. 2*c*. The long side LS is here formed in each case by two side wall elements SE1, SE2 of different widths. The broad side BS is formed in each case by one side wall element SE3. On the long side LS, the side wall elements SE1, SE2 are arranged in such a way that the side wall elements SE1, SE2 of the same width do not lie opposite. It is thereby possible, for example, to improve the torsional stiffness of the extraction system AA, as a result of which it is possible, for example, to avoid damage to the extraction system AA during transport.

Of course, the illustrations in FIGS. 2*a-c* show only a choice of the options for combining side wall elements of the same and different widths. A combination of the options shown in FIGS. 2*a-c* is possible depending on the application.

In FIGS. 2*a-c*, the side wall elements SE of the extraction system AA have a circumferential edge-shaped fold AK, said fold AK being directed outward A (direction of the arrow).

On account of the outwardly directed folds AK of the side wall elements SE, the inner surface IO of the side wall elements SE forms a flat, stepless surface. In FIGS. 2*a-c* it can be seen that, at the junction of two adjacent side wall elements SE1, SE2, SE3 arranged linearly with respect to each other, the inner surface IO has no transition. This ensures that air flowing along the inner surface IO is not caused to be turbulent. This achieves a better cleaning result for the extraction system AA.

In FIGS. 2*a-c*, the side wall elements SE1, SE2, SE3 arranged next to one another on the long side LS or broad side BS are connected to one another, for example by means of a screw connection (not shown), the screw connection being guided through corresponding drilled holes BL (not shown) in the folds AK. However, it is also possible that the side wall elements SE1, SE2, SE3 are connected by means of plug connectors (not shown) provided at the folds AK.

FIG. 2*c* shows a further possibility of connecting two side wall elements arranged adjacent to each other on the long side or broad side. For example, the two side wall elements SE2 adjoining on the long side LS are connected to each other by means of a first connection element VB1. The first connection element VB1 here has a receiving region AB in the form of a groove, into which the two folds AK of the two second side wall elements SE2 are introduced. The first connection element VB1 can thus be moved along the longitudinal axis LA of the extraction system AA over the mutually adjoining folds AK, thereby ensuring a reliable connection between the two second side wall elements SE2.

FIGS. 2*a-c* also show the connection of a side wall element SE1 of the long side LS to a side wall element SE3 of the broad side BS, in the form of a corner angle element EW. By means of the corner angle element EW, the folds AK of the respective side wall elements SE1, SE3 are connected by means of a screw connection (not shown).

FIG. 2*c* moreover shows an example of a second connection element VB2 for connecting a side wall element SE2 of the long side LS and a side wall element SE3 of the broad side BS, the side wall elements SE2, SE3 being arranged perpendicular to each other and with their folds AK adjoining each other. The second connection element VB2 has a receiving region AB for receiving the two mutually perpendicular folds AK of the side wall elements SE2, SE3. The two folds AK are fixed in the receiving region AB, thereby achieving a reliable connection of the two side wall elements SE2, SE3. Here, the receiving region AB of the second connection element VB2 is designed to receive a corner angle element EW. The stability of the extraction system AA is thus further improved. Of course, it is also possible to do without the additional corner angle element EW, thereby obtaining a simple way of realizing the system according to the invention with comparatively few parts. Furthermore, the connection elements VB1 and VB2 also contribute to better sealing of the interior of the extraction system, so that an advantageous double effect can be achieved through their use.

Figure 3:
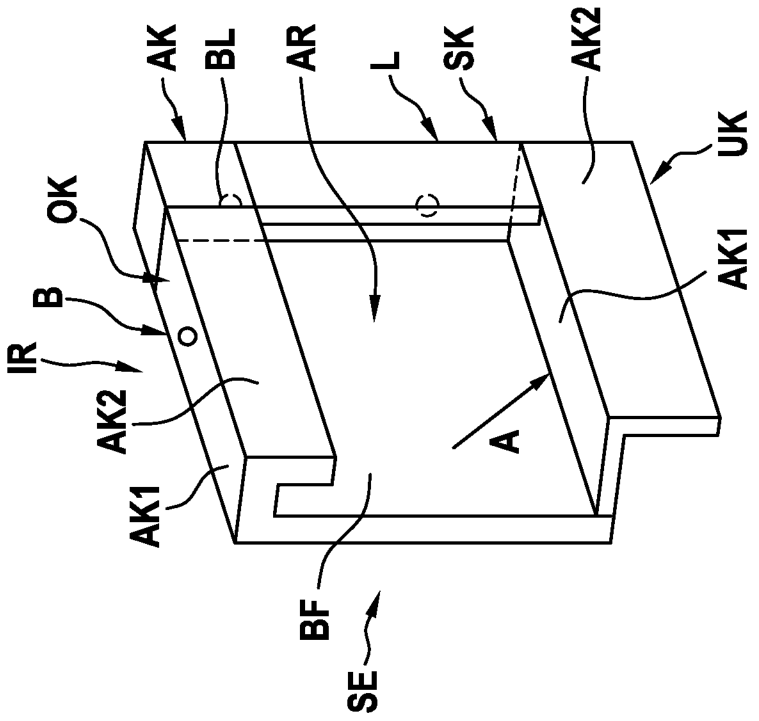
FIG. 3 shows an exemplary sectional view of a side wall element.

FIG. 3 shows a schematic sectional view of a side wall element SE. The rectangular side wall element SE has a respective fold AK on the broad sides B and on the long sides L. These folds AK point outward A (direction of the arrow) to the exterior of the extraction system AA. By means of the circumferential fold AK of the side wall element SE, the side wall element SE has a trough-shaped structure. The folds AK also have mounting holes BL. By means of these mounting holes BL, the side wall elements SE can be connected to each other.

It can also be seen from FIG. 3 that the folds AK consist of a first portion AK1 and a second portion AK2, which are folded or bent with respect to a base surface BF of the side wall element SE. On the upper edge OK and on the side edges SK of the side wall element SE, the folds AK are U-shaped. On the lower edge UK of the side wall element SE, the fold AK is S-shaped. The first portion AK1 is folded outward A at 90° with respect to the base surface BF. On the upper edge OK and on the side edges SE, the second portion AK2 is folded by a further 90° with respect to the first portion AK1 in such a way that the second portion AK2 lies opposite the base surface BF. On the lower edge UK, the second portion AK2 is folded with respect to the first portion AK1 in such a way that the second portion AK2 is parallel to the base surface BF but does not lie opposite the latter.

Figure 4:
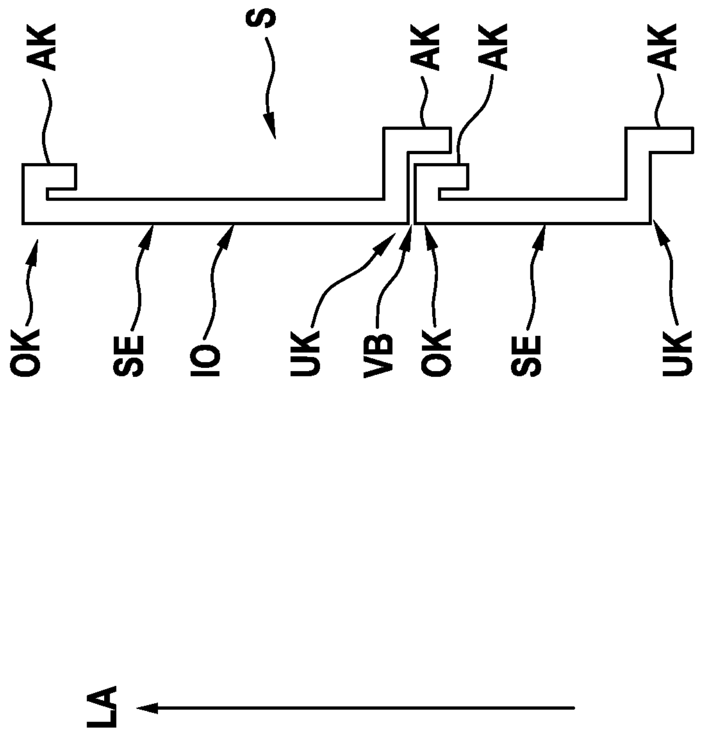
FIG. 4 shows an exemplary sectional view of two side wall elements arranged one above the other

FIG. 4 shows an exemplary sectional illustration of a side wall S with two side wall elements SE which are arranged one above the other, i.e. in the direction of the longitudinal axis LA (see FIG. 1*a*). As has already been described for FIG. 3, the side wall elements SE have, on the upper edge OK, a U-shaped fold AK. On the lower edge UK, the side wall elements SE have an S-shaped fold AK. The S-shaped fold AK of the upper side wall element SE engages over the U-shaped fold AK of the upper edge OK of the lower side wall element SE. The fold AK of the lower edge UK of the upper side wall element SE is connected, by means of the connection elements VB, to the fold AK of the upper edge OK of the lower side wall element SE. The inner surface IO of the side wall S has no projection or step at the junction of the two side wall elements SE. This ensures that air which is to be cleaned, and which flows along the inner surface IO, is not caused to swirl.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An extraction system for polluted air with a circumferential side wall, the side wall having at least four detachable side wall elements, wherein at least one side wall element of the at least four detachable side wall elements is designed with a trough shape, in such a way that the at least one side wall element has an edge-shaped, outwardly directed fold, and wherein the at least one side wall element has a base surface with an upper edge, a lower edge and two side edges, and folds on the upper edge and on the two side edges are U-shaped with the base surface, and a fold on the lower edge is S-shaped with the base surface.

2. The extraction system as claimed in claim 1, wherein at least one side wall element has one or more access openings, which can be closed by means of a door element.

3. The extraction system as claimed in claim 1, wherein the S-shaped fold on the lower edge of the side wall element is designed in such a way that, when two side wall elements are arranged along a longitudinal axis of the extraction system, the S-shaped fold on the lower edge of an upper side wall element at least partially engages around the U-shaped fold on the upper edge of a lower side wall element.

4. The extraction system as claimed in claim 1, wherein a connection element is present for connecting two side wall elements, the connection element having a receiving region for receiving at least one portion of the fold of both side wall elements.

5. The extraction system as claimed in claim 1, wherein a corner angle element is present for screwing together a first side wall element and a second side wall element, which is arranged perpendicular to the latter.

6. The extraction system as claimed in claim 1, wherein the number of side wall elements along one long side is different from the number of side wall elements of the other long side, and/or the number of side wall elements along one broad side is different from the number of side wall elements of the other broad side.

7. An extraction system for polluted air, the extraction system comprising:

a circumferential side wall comprising four detachable side wall elements, wherein the four detachable side wall elements comprise:

a U-shaped fold at an upper edge; and a S-shaped fold at a lower edge.

8. The extraction system according to claim 7, wherein each of the four detachable side wall elements has a U-shaped fold at an upper edge and a S-shaped fold at a lower edge.

9. The extraction system according to claim 8, wherein the S-shaped fold at the lower edge of an upper one of the four detachable side wall elements is configured to engage the U-shaped fold of a lower one of the four detachable side wall elements.

10. The extraction system according to claim 7, wherein at least one side wall element of the four detachable side wall elements is designed with a trough shape.

11. The extraction system according to claim 7, further comprising a connection element configured to connect two of the four detachable side wall elements.

12. The extraction system according to claim 11, wherein the connection element has a receiving groove for receiving a fold of the two side wall elements.

13. The extraction system according to claim 7, further comprising a corner angle element configured to screw together a first side wall element of the four detachable side wall elements and a second side wall element of the four detachable side wall elements, the second side wall element being arranged perpendicular to the first side wall element.

14. The extraction system according to claim 7, wherein a number of side wall elements along one long side is different from a number of side wall elements of another long side.

15. The extraction system according to claim 7, wherein a number of side wall elements along one broad side is different from a number of side wall elements of another broad side.

16. The extraction system according to claim 7, wherein a number of side wall elements along one long side is different from a number of side wall elements of another long side, and a number of side wall elements along one broad side is different from a number of side wall elements of another broad side.

* * * * *